United States Patent
Conner et al.

(10) Patent No.: US 7,259,801 B2
(45) Date of Patent: Aug. 21, 2007

(54) LARGE-PANEL TABLE-TOP REAR PROJECTION TELEVISION

(75) Inventors: Arlie R. Conner, Portland, OR (US);
Bruce L. Cannon, Portland, OR (US);
Gary B. Kingsley, Beaverton, OR (US)

(73) Assignee: 3M Innovative Properties Company, St. Paul, MN (US)

( * ) Notice: Subject to any disclaimer, the term of this patent is extended or adjusted under 35 U.S.C. 154(b) by 500 days.

(21) Appl. No.: 10/858,785

(22) Filed: Jun. 2, 2004

(65) Prior Publication Data

US 2005/0270431 A1     Dec. 8, 2005

(51) Int. Cl.
*H04N 9/31*     (2006.01)
(52) U.S. Cl. ........................................ 348/744
(58) Field of Classification Search ................ 348/744, 348/751, 756, 787, 790, 794; 353/74, 77–79
See application file for complete search history.

(56) References Cited

U.S. PATENT DOCUMENTS

| | | | | |
|---|---|---|---|---|
| 4,030,821 A | * | 6/1977 | Badalich | 353/71 |
| 4,439,027 A | * | 3/1984 | Shioda et al. | 353/77 |
| 5,042,929 A | | 8/1991 | Tanaka et al. | |
| 5,218,480 A | | 6/1993 | Moskovich | |
| 5,625,495 A | | 4/1997 | Moskovich | |
| 5,710,669 A | | 1/1998 | Endo | |
| 5,796,446 A | * | 8/1998 | Marcellin-Dibon | 348/744 |
| 5,812,326 A | | 9/1998 | Yamada | |
| 5,822,129 A | | 10/1998 | Sekine | |
| 5,900,989 A | | 5/1999 | Kreitzer | |
| 5,963,375 A | | 10/1999 | Kreitzer | |
| 6,195,209 B1 | | 2/2001 | Kreitzer et al. | |
| 6,233,024 B1 | * | 5/2001 | Hiller et al. | 348/744 |
| 6,273,570 B1 | * | 8/2001 | Clifton et al. | 353/74 |
| 6,324,014 B1 | | 11/2001 | Moskovich | |
| 6,388,810 B1 | * | 5/2002 | Monson et al. | 359/443 |
| 6,476,974 B1 | | 11/2002 | Kreitzer | |
| 6,561,649 B1 | * | 5/2003 | Burstyn | 353/8 |
| 6,765,731 B1 | | 7/2004 | Cannon | |
| 6,853,493 B2 | | 2/2005 | Kreitzer | |
| 6,873,460 B1 | * | 3/2005 | Burstyn et al. | 359/461 |
| 6,956,624 B2 | * | 10/2005 | Hirata et al. | 348/744 |
| 2002/0141072 A1 | | 10/2002 | Moskovich | |
| 2003/0011895 A1 | | 1/2003 | Mori | |

FOREIGN PATENT DOCUMENTS

WO      WO99/26090     5/1999

OTHER PUBLICATIONS

Dunham, C.B., and C.R. Crawford, "Minimax Approximation by a Semi-Circle," Society for Industrial and Applied Mathematics, vol. 17, No. 1, Feb., 1980, pp. 63-65.
U.S. Appl. No. 10/858,786, entitled "Compact Projection Lenses for use with Large Format Pixilized Panels", filed on Jun. 2, 2004.
U.S. Appl. No. 10/858,777, entitled "Color-Corrected Projection Lenses for use with Pixilized Panels", filed on Jun. 2, 2004.

* cited by examiner

*Primary Examiner*—Paulos M. Natnael
(74) *Attorney, Agent, or Firm*—George W. Jonas

(57) ABSTRACT

A table-top rear projection television employs a single large-panel (e.g., 7 inch-15 inch, 17.5 cm-38 cm, diagonal), multi-color transmissive imaging device (e.g., an amorphous silicon liquid crystal display). The rear projection television has a cabinet with a pedestal having a height and a depth that are each less than or equal to about 0.65 the height of the display screen. The display screen may have any aspect ratio of a wide format (e.g., 16:9, 15:9, 16:10) or a conventional format (i.e. 4:3).

28 Claims, 8 Drawing Sheets

BASIC THIN LENS:

TELEPHOTO LENS

REVERSE-TELEPHOTO (RETRO-FOCUS) LENS

LARGE-PANEL TABLE-TOP REAR PROJECTION TELEVISION

TECHNICAL FIELD

The present invention relates to rear projection displays or televisions and, in particular, to a rear projection television that employs a large multi-color display panel and is compatible with table-top placement.

BACKGROUND AND SUMMARY OF THE INVENTION

Rear projection displays or televisions include an image-generating system positioned behind a display screen, opposite from where viewers watch the images that are projected onto the screen. Typical rear projection televisions employ three scanning projection cathode-ray tubes (CRTs), one for each of the primary color components red, green, and blue.

Projection cathode-ray tubes are cumbersome, as are the optical systems for projecting and superimposing the separate color component images on the display screen. As a result, early rear projection televisions required large, floor-mounted cabinets to accommodate the cumbersome projection CRTs and their optical systems. The cabinets include pedestals, or pedestal portions, that are positioned below the display screen and contain the projection CRTs and the optical systems.

Some rear projection displays have employed a single large transmissive pixelated liquid crystal display (LCD) panel with optics analogous to those of a front projection display. These rear projection displays were bulky and heavy and directed to specialized display applications such as trade show displays. Examples of rear projection displays were available from Barco NV of Kortrijk, Belgium and Optoma Corp. of Taipei, Taiwan.

The miniaturization of liquid crystal displays has allowed rear projection televisions to be reduced in size while maintaining or enlarging display screen size. Likewise, other miniaturized electronic imaging devices, such as pixelated reflective imaging elements referred to as digital micromirror devices and available from Texas Instruments, Incorporated, have also allowed rear projection televisions to be reduced in size while maintaining or enlarging display screen size.

As one example, a rear projection television incorporates three small-size LCDs (e.g., 1.3 inch or 3.3 cm, diagonal) for separately controlling the three primary color components red, green and blue. Such a rear projection television is available from Sony Corporation as the Grand Wega™ model (model number KF-50XBR800). As another example, a rear projection television employing a digital micromirror device (e.g., 0.8 inch, 2.0 cm, diagonal) is the Model HLM507W projection television available from Samsung Corporation. Both of these rear projection television include display screens with 50-inch (127 cm) diagonal measurements.

Rear projection televisions with miniaturized electronic imaging devices (e.g., LCDs or digital micromirror devices) have been sized and have pedestals to accommodate table-top viewing. For example, the Grand Wega™ model available from Sony Corporation has a pedestal with a height of 12 inches (30.5 cm) and a depth of 14 inches (35.5 cm). Similarly, the Model HLM507W available from Samsung Corporation has a pedestal with a height of 8 inches (20 cm) and a depth of 17 inches (43 cm). With the 16:9 aspect ratios of the display screens, the pedestal of the Grand Wega™ has a height and depth that are respectively about 0.57 and 0.51 the height of the display screen, and the Model HLM507W has a height and depth that are respectively about 0.31 and 0.67 the height of the display screen. As referenced herein, therefore, table-top rear projection televisions include a cabinet pedestal having a height and a depth that are each less than or equal to about 0.65 the height of the display screen.

Available table-top rear projection televisions based upon miniaturized imaging elements, such as LCDs or digital micromirror devices, are expensive. Multiple miniaturized LCDs, and their triplicate optical systems, increase the cost and complexity of the televisions. Digital micromirror devices are based upon an expensive and complex proprietary technology. In addition, miniaturized imaging elements require powerful optical elements to magnify or project the video images. The optical elements must magnify an image from each LCD (e.g., 1.3 inch or 3.3 cm, diagonal) or a digital micromirror device (e.g., 0.8 inch, 2.0 cm) to the full extent of a 50-inch (127 cm) display within the confines of a table-top cabinet. In addition to being powerful, such optical elements are subject to distortion. Providing such powerful optical elements with acceptable distortion properties further adds to the expense of these televisions.

Accordingly, the present invention provides a table-top rear projection television that employs a single large-panel (e.g., 7 inch-15 inch or more, 17.5 cm-38 cm, diagonal), multi-color transmissive imaging device (e.g., an amorphous silicon liquid crystal display). The rear projection television has a cabinet with a pedestal having a height and a depth that are each less than or equal to about 0.65 the height of the display screen, with the factor being less than about 0.55 in some embodiments. The display screen may have any aspect ratio of a wide format (e.g., 16:9, 15:9, 16:10) or a conventional format (i.e. 4:3).

An illumination system is positioned in the pedestal and directs light along an optical path. The large-panel LCD receives the light and imparts video images on the light. A short conjugate fold mirror and a short vertex-to-vertex projection lens successively receive the light with the imparted video images, and a long conjugate fold mirror then folds the optical path from the projection lens and directs the light through the display screen.

The rear projection television of the present invention, and the associated optical elements, reverse the course of conventional design development for rear projection televisions by employing a large-panel LCD in a table-top television. The use of the large-panel LCD relaxes the performance requirements of the projection optics and can provide rear projection televisions at significantly reduced costs.

Additional description and implementations of the present invention will be apparent from the detailed description of the preferred embodiment thereof, which proceeds with reference to the accompanying drawings.

DETAILED DESCRIPTION OF PREFERRED EMBODIMENTS

Figure 1:
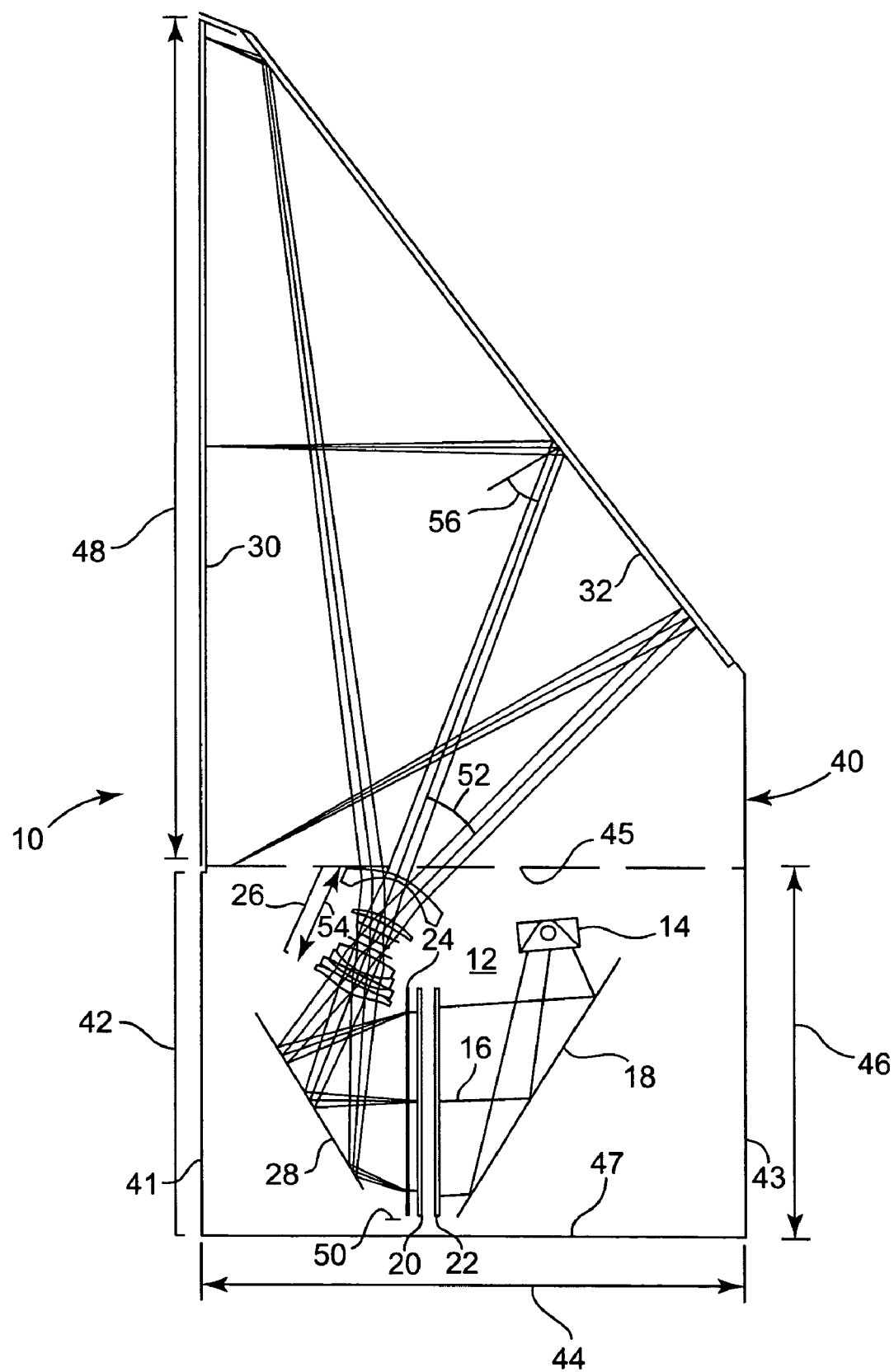
FIG. 1 is a schematic side diagram of a large-panel, table-top rear projection television according to the present invention.

FIG. 1 is a sectional side view of a large-panel table-top rear projection television 10. Rear projection television 10 has an optical system 12 that includes an illumination system 14 directing illumination light along an optical path 16 to an illumination fold mirror 18. Illumination fold mirror 18 folds optical path 16 and directs the light through a large-panel (e.g., at least 17 cm, or 7 inch, diagonal) multi-color transmissive pixelated display panel 20, such as an amorphous silicon liquid crystal display (LCD) 20.

Large-panel LCD 20 includes sub-pixels for separately controlling multiple primary color components, such as red, green, and blue. In one implementation, large-panel LCD is a 15-inch (38 cm) diagonal amorphous silicon LCD that is cropped to use a 16:9 region, thereby giving an effective diagonal of 12.88 inches (32.7 cm).

Large-panel LCD 20 imparts a multi-color image onto the illumination light according control signals corresponding to video images, such as television video images, as is known in the art. Large-panel LCD 20 receives the illumination light from a Fresnel lens 22 that collimates the illumination light for improved color and brightness uniformity. A converging Fresnel lens 24 focuses the light of the video images from large-panel LCD 20 toward the entrance pupil of a short vertex-to-vertex projection lens 26 via a short conjugate fold mirror 28. Projection lens 26 projects the light of the video images onto a large (e.g., at least 120 cm or 47 inches, diagonal) translucent display screen display screen 30 via a primary or long conjugate fold mirror 32.

The "table-top" characterization means that rear projection television 10 is contained within a cabinet 40 that is compatible with placement on top of a table for viewing. Cabinet 40 includes a pedestal 42 that is positioned under display screen 30 and contains optical system 12, other than display screen 30 and fold mirror 32.

To be compatible with table-top placement, pedestal 42 has a depth 44 from a front edge 41 to a rear edge 43 for a display screen 30 with a height dimension 48. Pedestal 42 has a height 46 from a top edge 45 immediately beneath display screen 30 to a bottom edge 47 for the same height dimensions 48. Height dimension 48 of the stated ranges may correspond to a display screen 30 with a conventional wide format aspect ratio of 16:9 (sometimes implemented as 15:9 or 16:10) or a conventional television aspect ratio of 4:3. It will be appreciated that the height dimension 48 of display screen 30, together with its aspect ratio, defines the dimensions of display screen 30. In one implementation, pedestal 42 has a depth 44 of 48 cm (19 inches) and a height 46 of 25.5 cm (10 inches) for display screen 30 having a height dimension 48 of 75 cm (29.5 inches). In other implementations, pedestal 42 has a depth 44 and a height 46 that are both 0.55 or less than the screen height 48.

Accordingly, table-top characterization of rear projection television 10 may be generalized with the dimensions of pedestal 42 by the following relationships:

$0.40\ H \leq d \leq 0.65\ H$ $h \leq 0.65\ H$, in which H corresponds to height dimension 48 of display screen 30, d corresponds to depth 44 of pedestal 42, and h corresponds to height 46 of pedestal 42.

Figure 9:
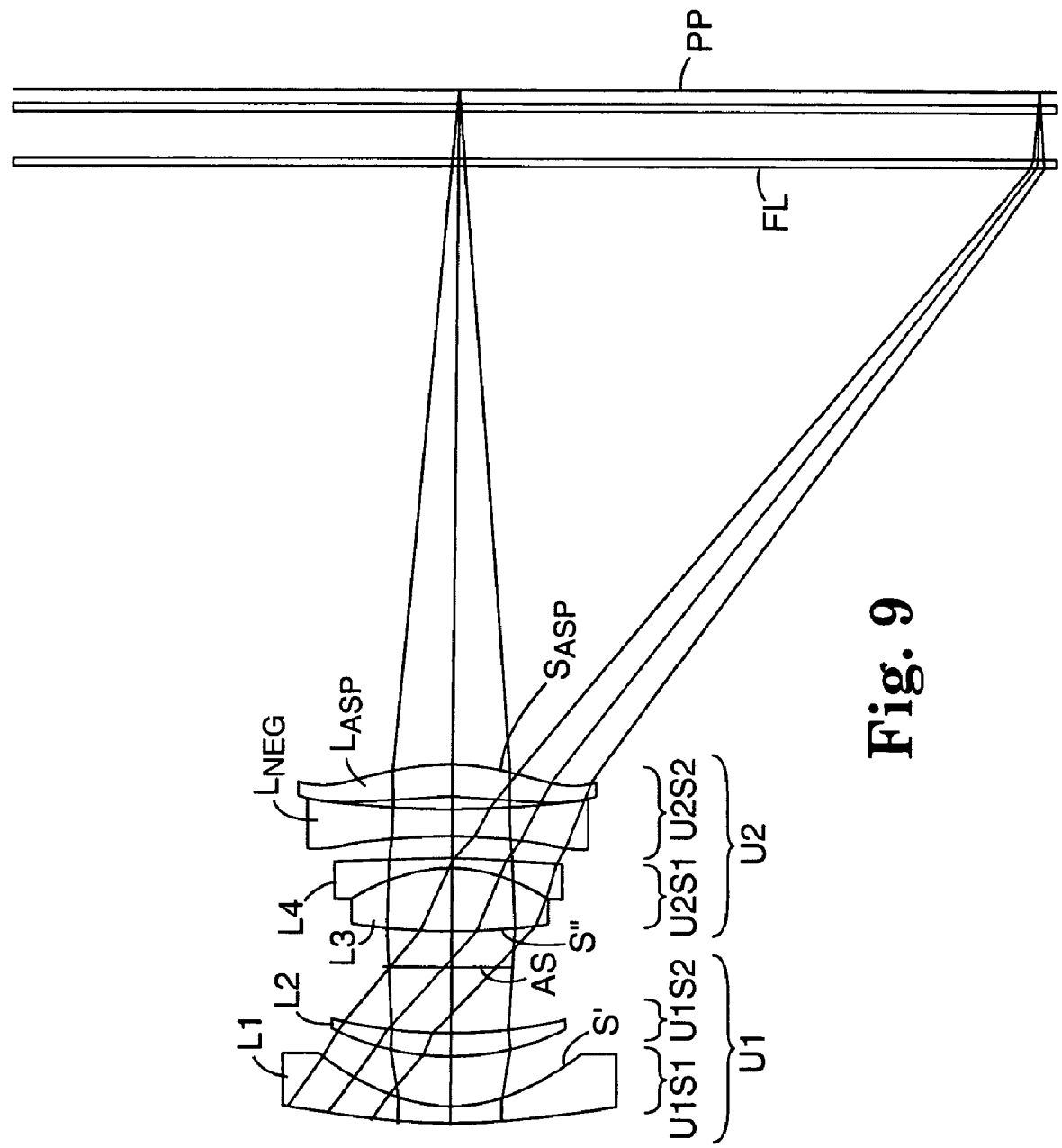
Figure 10:
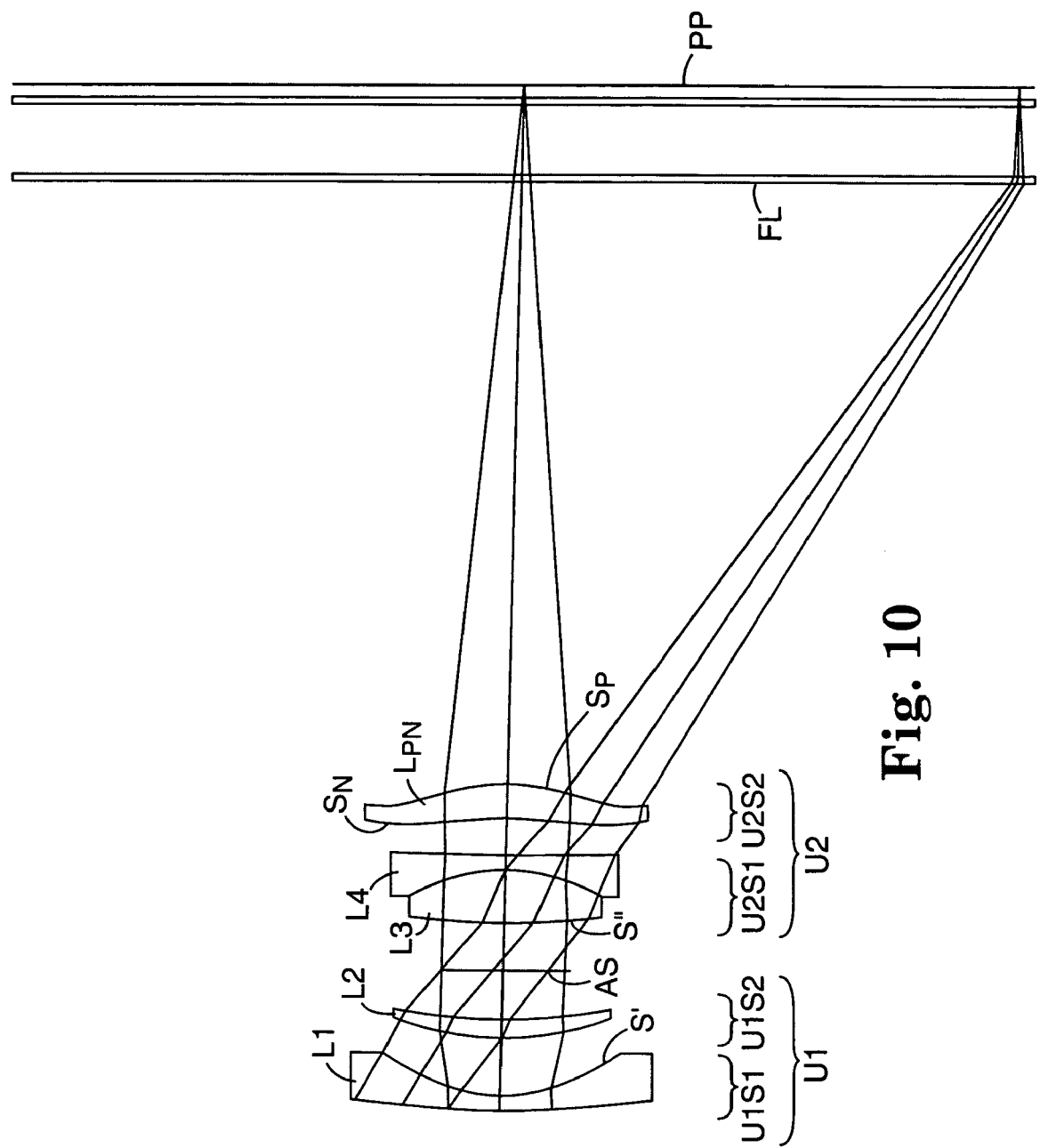

In conjunction with depth 44 and height 46 of pedestal 42, projection lens 26 has an output half-angle 52 (to diagonal corners of display screen 30, as shown in FIG. 9) of 44°-46° and has a short vertex-to-vertex distance 54 of 70 mm-150 mm. For example, projection lens 26 has an aperture of F/4.0-F/10.0. Long conjugate fold mirror 32 folds optical path 12 by a half-angle 56 of 33°-36°. Output half-angle 52 allows projection lens 26 to project video images from large-panel LCD 20 onto display screen 30, and short vertex-to-vertex distance 54 enables projection lens 26 to fit within pedestal 42 without obstructing reflections from fold mirror 32 to display screen 30. Half-angle 56 of long conjugate fold mirror 32 is selected to be between 33° and 36°, for example, so as to place projection lens 26 near the front of pedestal 42, thereby reducing the depth of long conjugate fold mirror 32 and cabinet 40.

Figure 2:
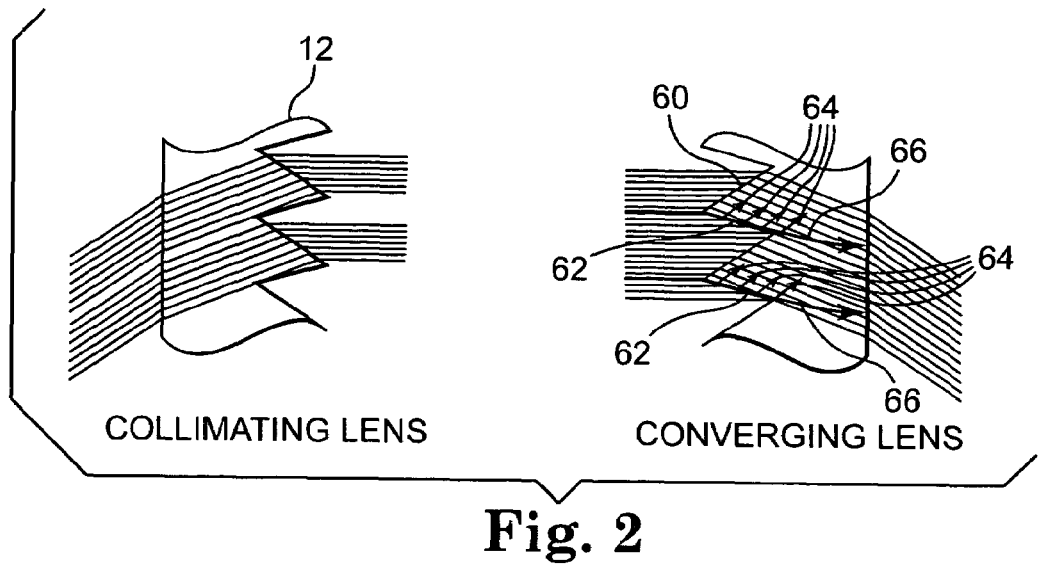
FIG. 2 is an enlarged schematic side view illustrating Fresnel lenses and the light passing through them.

FIG. 2 is an enlarged schematic side view illustrating Fresnel lenses 22 and 24 and the light passing through them. As is known in the art, Fresnel lenses can typically operate up to about F/0.6, which means that the angles at the Fresnel lens facets 60 are approaching 45 degrees. Converging Fresnel facets 60 at such high angles introduce light losses, either from hitting external faces of risers 62, referred to as external riser loses 64, or from hitting internal faces of risers 62, referred to as internal riser losses 66. It will be appreciated that collimating Fresnel lenses have no loss at facet risers.

It will be appreciated that there is a maximum angle at which Fresnel lenses 22 and 24 can be used. The "steeper," or "faster" a Fresnel lens operates (i.e., as the facet angle approaches the maximum angle), the shorter the overall system path can be. With reference to converging Fresnel lens 24, the orientation that allows highest angle usage has the Fresnel risers 66 oriented toward the collimated space and planar surfaces 68 oriented to the short focus. In the illustrated implementation, the short focus is toward projection lens 26. In this optical layout, the largest amount of loss in the vicinity of the picture edge occurs on the projection lens side from converging Fresnel lens 24.

Figure 3:
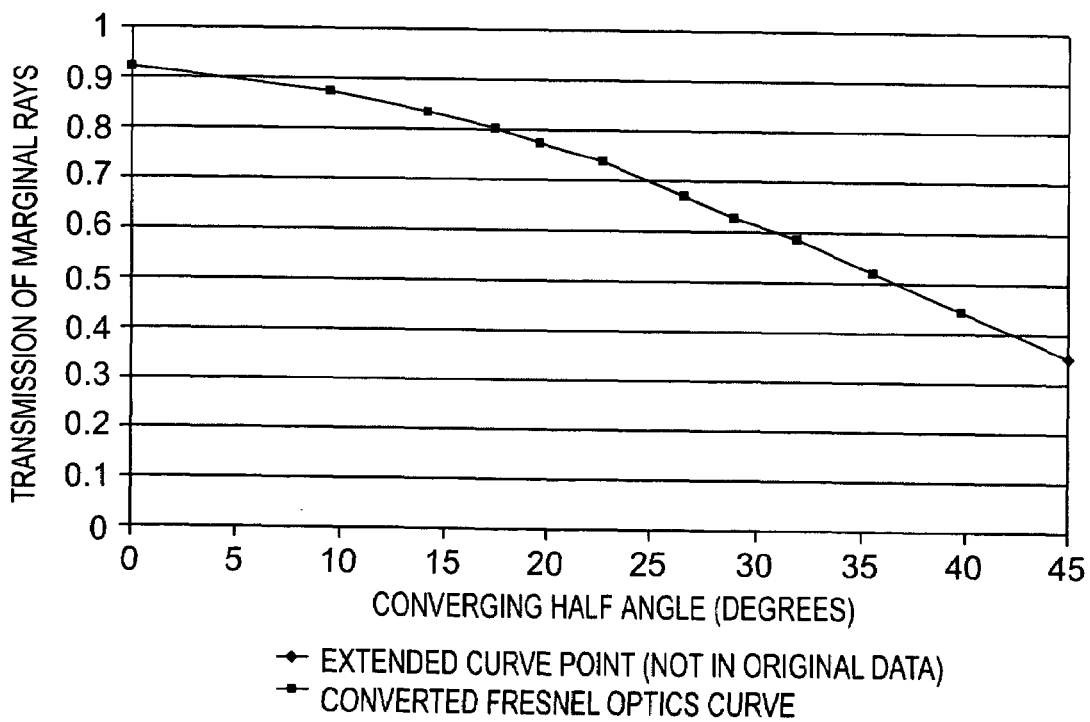
FIG. 3 is a graph illustrating losses for one implementation of a converging Fresnel lens.

FIG. 3 is a graph illustrating losses for a converging Fresnel lens 24. In particular, the graph of FIG. 3 illustrates for the converging Fresnel lens 24 the transmission of marginal rays versus convergence half angle. As illustrated in FIG. 3, light is lost by converging Fresnel lens 24 at facet risers 66.

This loss increases at the corners of the display as the converging angle increases. Historically, projection lens assemblies for projection display systems have closely matched the focal length of the converging Fresnel lens. The result is that the projection half angle of the projection lens closely matches the converging half angle of the light from the converging Fresnel lens, and the overall projection path is very long. A long projection path is acceptable for front projection systems, because the projection half angle remains fairly low relative to the Fresnel lens losses. In rear projection applications, however, wide-angle projection (e.g., 40° half angle or larger) is desired to keep cabinet and pedestal sizes small, and image uniformity becomes difficult to achieve.

In order to alleviate this problem and keep the brightness uniformity falloff to an acceptable level, the projection relay path of a rear-screen large-LCD display would typically be lengthened in order to reduce the converging angle of the Fresnel lens. This results in a long projection throw, which in turn results in a large cabinet or pedestal for the system. A long projection throw also requires many system fold mirrors to keep the light contained in the enclosure. Each fold mirror adds weight, cost, and light loss.

In the present invention converging Fresnel 24 has facets 60 with angles that are small enough to prevent excessive riser loss and brightness falloff at the edge of the display. In one implementation, projection lens 26 deviates from the conventional form of a simple, long focal length projection lens and adds a positive group between converging Fresnel 24 and the pupil, thereby giving projection lens 26 a retro-focus and a shorter focal length. This gives lower angles across converging Fresnel 24, but reduces the overall length of projection lens 26 and decreases the long conjugate distance (i.e., lens-to-screen distance).

Figure 4:
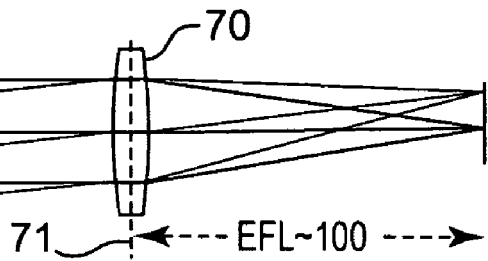
FIG. 4 is a schematic diagram illustrating distinguishing characteristics of a basic thin lens, a telephoto lens, and a reverse-telephoto or retro-focus lens.
Figure 4:
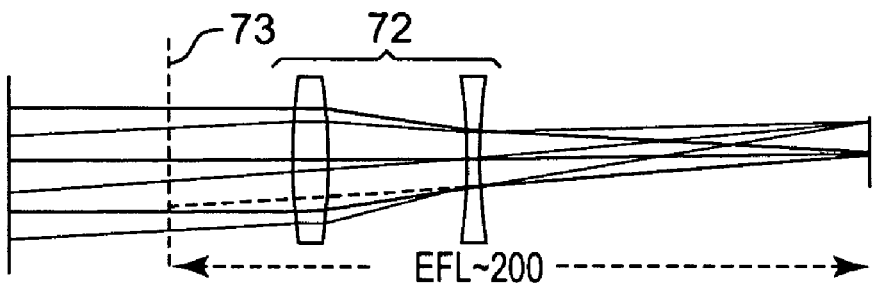
Figure 4:
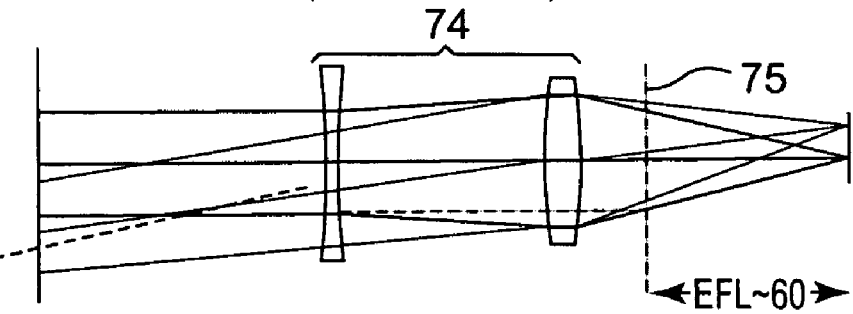

FIG. 4 is a schematic diagram illustrating distinguishing characteristics of a basic thin lens 70, a telephoto lens 72 and a reverse-telephoto, or retro-focus lens 74. In basic thin lens 70, the principal plane 71 occurs within the lens. As an illustration, basic thin lens is shown with an effective focal length of 100 (arbitrary units). In telephoto lens 72, the principal plane 73 occurs beyond the lens opposite the side with the image focal point and results in a greater effective focal length (e.g., 200 units as shown). In retro-focus lens 74, the principal plane 75 occurs between the lens and the image focal point and results in a shorter effective focal length (e.g., 60 units, as shown).

In addition to the improved brightness uniformity, a retro-focus style lens allows more flexibility in the cabinet packaging. A conventional projections lens generally keeps the marginal angles (i.e., angles of the extreme rays at the edge of the display) at some angle smaller than 35 degrees in order to keep Fresnel loss down. This constraint also results in a long total optical path and requires many folds in a rear projection display to accomplish a small cabinet. This retro-focus lens feature allows a reduction of the marginal angles on converging Fresnel 24 from 40 degrees or more to a more reasonable range of 35 degrees to 25 degrees. The retro-focus lens and resulting angle reduction can bring the brightness uniformity at the corners (relative to the display center) to over 70% transmission, rather than the conventional brightness uniformity of less than 50%.

By reducing the convergence angle from converging Fresnel lens 24 while at the same time increasing the angle projected from the projection lens 26, the image uniformity is improved and wide angle projection is allowed. This can reduce the size required for the rear projection cabinet. The number of fold mirrors required in the optical system will also be reduced, which reduces the size, weight, and cost of the system, and will improve optical efficiency.

Figure 5:
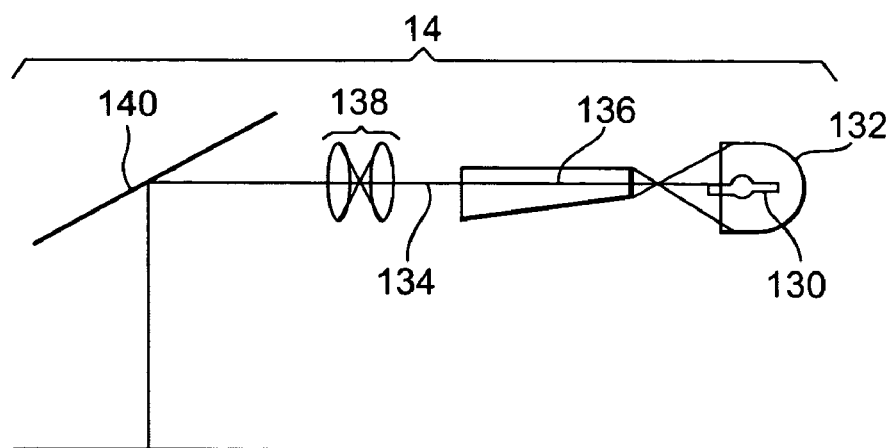
FIG. 5 is an enlarged side view of an exemplary implementation of an illumination system.

FIG. 5 is an enlarged side view of an exemplary implementation of illumination system 14 for use in rear projection television 10 or with rear projection television optical system 100. Illumination system 14 includes an arc lamp 130 with an elliptical reflector 132 that direct illumination light along an illumination light path 134. The illumination light passes through an internally reflective rod or tunnel 136 to increase lighting uniformity. The output side of reflective rod or tunnel 136 has an aspect ratio matched to that of the display screen (e.g., 16:9 ratio). Relay optics 138 direct the illumination light toward converging Fresnel lens 24, for example.

In rear projection television 10, for example, illumination light path 134 initially extends generally horizontally (e.g., into or out of the page of FIG. 1) and is folded downward toward illumination fold mirror (FIG. 1) by a fold mirror 140. It will be appreciated that in other implementations, illumination system 14 may optionally include polarization conversion systems or angular color separation, as known in the art, to further increase illumination brightness.

Figure 6:
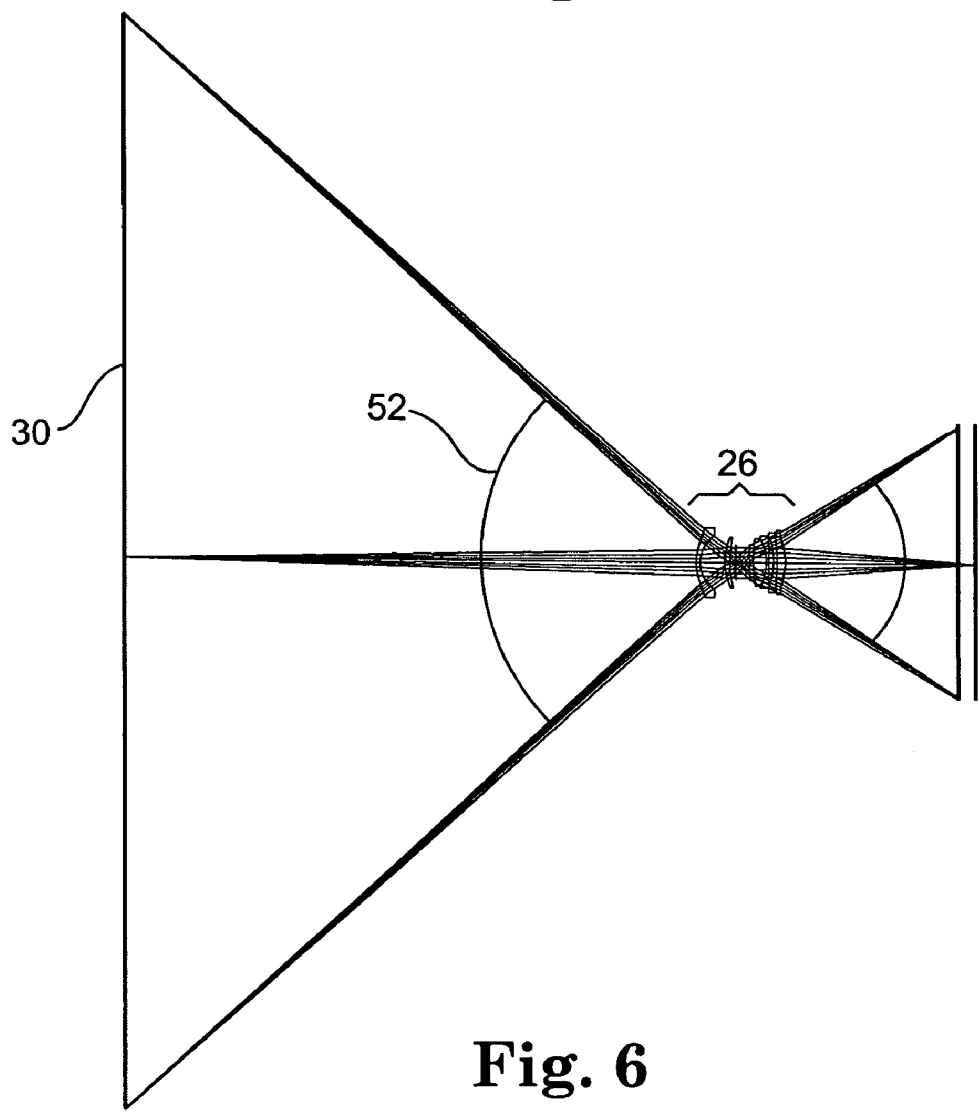
FIG. 6 is a diagram illustrating output half-angle of a projection lens extending to diagonal corners of a display screen.

FIG. 6 is a diagram illustrating output half-angle 52 of projection lens 26 extending to diagonal corners of display screen 30. The optical path in FIG. 6 is shown without folds to illustrate output half-angle 52.

Projection Lens Examples

As used herein, the following terms shall have the following meanings:

Optical Component: An optical component is a component which has optical power and/or corrects one or more monochromatic and/or one or more chromatic aberrations and which requires separate mounting and alignment from other components of the projection lens.

As illustrated by the examples present below, optical components include, for example, single lens elements and cemented doublets. Projection lenses having less optical components are preferred to projection lenses having more optical components because having less components simplifies assembly and generally results in a reduction in a projection lens' weight and component cost.

Barrel Length: Barrel length (BRL) is the distance between the vertex of the front surface of the forward-most optical component of the projection lens and the vertex of the back surface of the rearward-most optical component.

Power of a Lens Surface: In terms of the long conjugate and short conjugate sides of the projection lens, the power of a lens surface S of the projection lens is given by:

$$\phi_S = (n_{SC} - n_{LC})/(n_{LC} \cdot R)$$

where $n_{SC}$ and $n_{LC}$ are the indices of refraction on the short and long conjugate sides of the surface, respectively, and R is the radius of curvature of the surface at the point at which the power of the lens surface is being determined, e.g., the radius of curvature on-axis or at the clear aperture, which, in accordance with conventional practice, is positive when the center of curvature is on the short conjugate side of the surface.

Projection Systems: Image projection systems are used to form an image of an object, such as a display panel, on a viewing screen. Such systems can be of the front projection or rear projection type, depending on whether the viewer and the object are on the same side of the screen (front projection) or on opposite sides of the screen (rear projection).

FIGS. 7-10 and respective Tables 1-4 illustrate representative projection lens assemblies 26 constructed in accordance with the invention. The lenses of Examples 1 and 2 were designed for use with pixelized panels having diagonals of 15 inches (380 mm), while those of Examples 3 and 4 were designed for panel diagonals of 13 inches (330 mm) and 10 inches (250 mm), respectively. The lenses of these examples can be scaled to accommodate large-panel LCDs with diagonals of between at least 7 inches (17.5 cm) and 15 inches (38 cm), in a manner known in the art.

Figure 7:
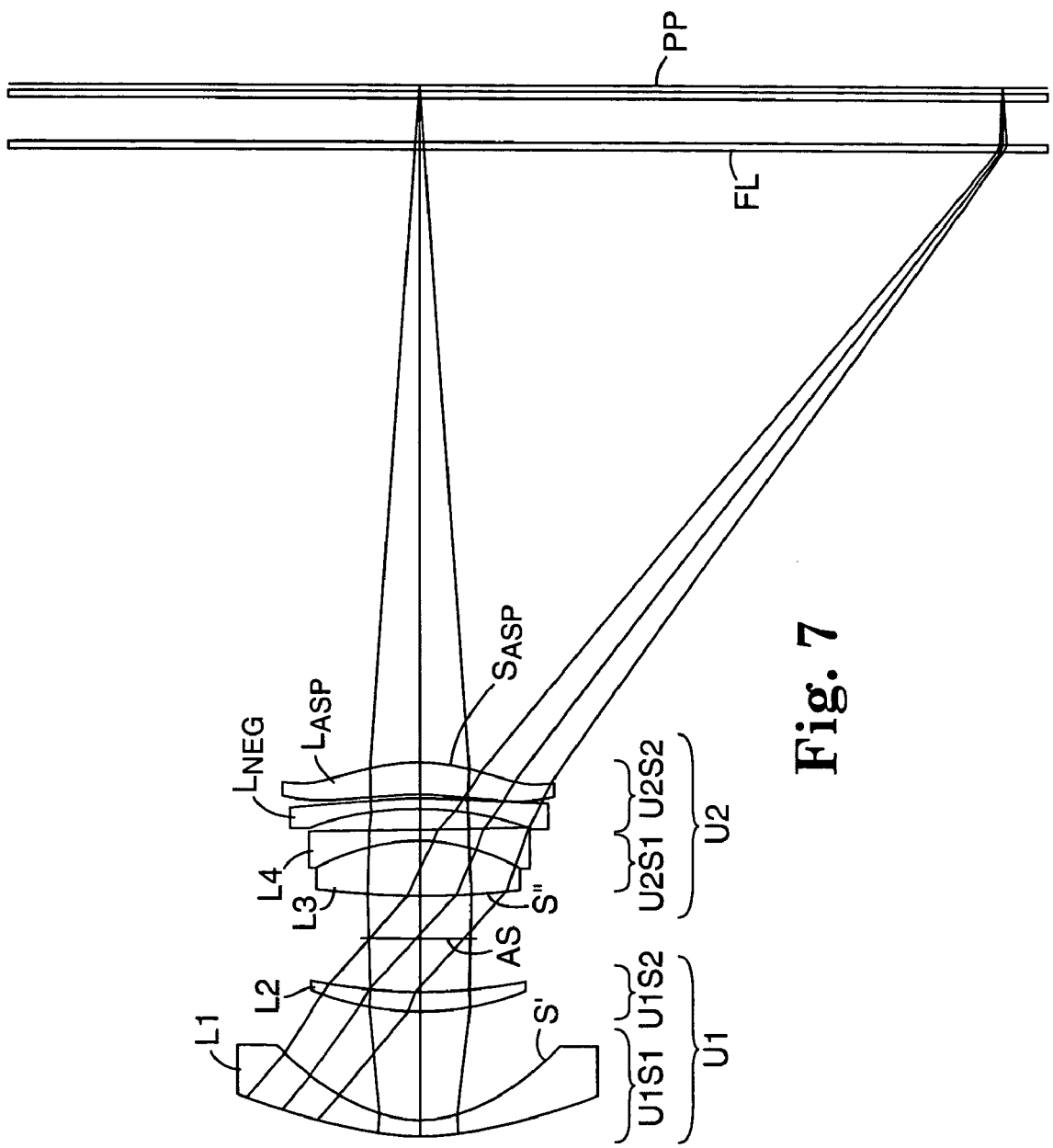
FIGS. 7-10 are schematic side views of representative short vertex-to-vertex projection lenses constructed in accordance with the invention.
Figure 8:
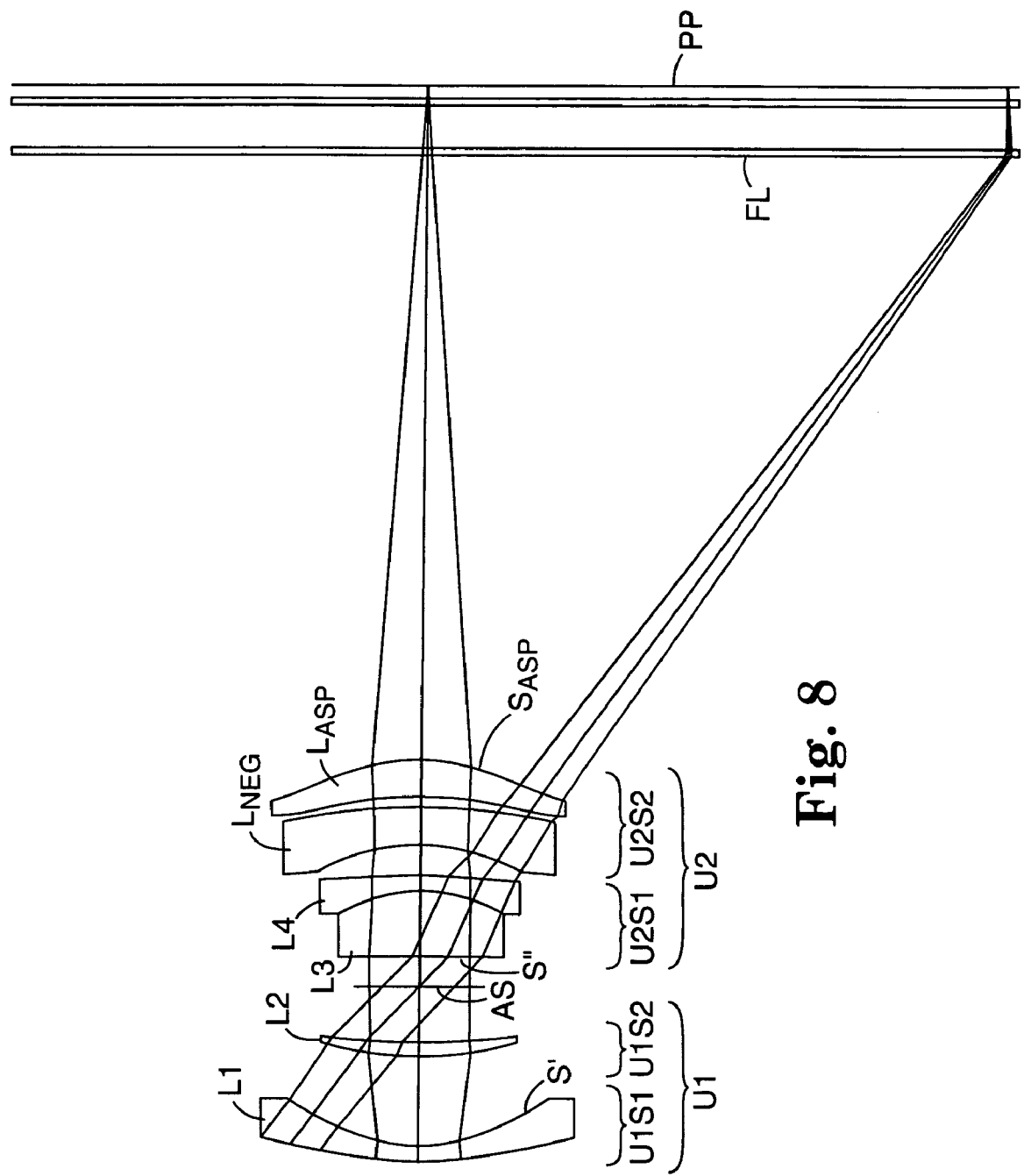

FIG. 7 is drawn based on the prescription of Table 1A. Table 1B shows a variation of this prescription with a somewhat larger space between U2S1 and U2S2 to facilitate assembly of the lens. Although not identical to the prescription of Table 1B, FIG. 7 shows the general structure of the lens of this table.

OHARA designations are used in the prescriptions of Tables 1-4 for the various glasses employed in the lens systems. Equivalent glasses made by other manufacturers (e.g., HOYA or SCHOTT) can be used in the practice of the invention. Industry acceptable materials are used for the plastic elements.

The aspheric coefficients set forth in the tables are for use in the following equation:

$$z = \frac{cy^2}{1+[1-(1+k)c^2y^2]^{1/2}} + Dy^4 + Ey^6 + Fy^8 + Gy^{10} + Hy^{12} + Iy^{14}$$

where z is the surface sag at a distance y from the optical axis of the system, c is the curvature of the lens at the optical axis, and k is a conic constant.

The various structures located on the short conjugate side of U2 in the figures and tables represent components (e.g., Fresnel lens, polarizer, cover glass) that are used with or are a part of the pixelized panel. They do not constitute part of the projection lens. All dimensions given in Tables 1-4 are in millimeters except where other units are indicated.

The prescription tables are constructed on the assumption that light travels from left to right in the figures. In actual practice, the viewing screen will be on the left and the pixelized panel will be on the right, and light will travel from right to left. In particular, the references in the prescription tables to objects/images and entrance/exit pupils are reversed from that used in the rest of the specification. The pixelized panel is shown in the FIGS. 7-10 by the designation "PP" and the aperture stop is shown by the designation "AS".

Tables 5 and 6 summarize various of the properties of the projection lenses of Examples 1-4. In particular, Table 5 sets forth the $f_{U2}/f_0$, $f_{U2S1}/f_0$, and $|f_{neg}|/f_0$ or, in the case of Example 4, the $1/(|\phi_{neg}|\bullet f_0)$ values for these examples, as well as their $FOV_{LC}$ and $FOV_{SC}$ values. As shown in this table, $f_{U2}/f_0$ is less than 1.5 in all cases, $f_{U2S1}/f_0$ is less than 2.0, and the $|f_{neg}|/f_0$ or $1/(|\phi_{neg}|\bullet f_0)$ values are less than 2.0 and 1.5, respectively. Also, the $FOV_{LC}$ and $FOV_{SC}$ values are greater than 80° and 60°, respectively.

Table 6 sets forth the $BRL/f_0$ and $CA_{max}/f_0$ values for these examples, where $CA_{max}$ is the projection lens' maximum clear aperture, i.e., the maximum clear aperture of all of the optical components of the projection lens. As shown therein, the $BRL/f_0$ values are all less than 0.85 and the $CA_{max}/f_0$ are all less than 0.75. As discussed above, the lenses of Examples 1 and 2 were designed for use with pixelized panels having diagonals of 15 inches (380 mm), while those of Examples 3 and 4 were designed for panel diagonals of 13 inches (330 mm), and 10 inches (250 mm), respectively. These diagonal values can also be used as a measure of the compactness of the projection lenses of the invention. The last two rows of Table 6 set forth $BRL/D_{PP}$ and $CA_{max}/D_{PP}$ values for Examples 1-4, where $D_{PP}$ is the diagonal length in millimeters, i.e., 380 mm for Examples 1 and 2, 330 mm for Example 3, and 250 mm for Example 4. As can be seen, the $BRL/D_{PP}$ values are all less than 0.4, and the $CA_{max}/D_{PP}$ values are all less than 0.35.

As a comparison, U.S. Pat. No. 5,812,326 of Yamada describes a wide-angle lens for cabinet LCD projection systems employing an LCD with 127 mm (5 inch) diagonal measurement. The wide-angle lens of Yamada includes a $CA_{max}/D_{PP}$ value of about 0.55 and a $BRL/D_{PP}$ value of about 1.12. Even with a small-panel LCD having 127 mm (5 inch) diagonal measurement, the wide-angle lens of Yamada has a long proportional barrel length and a large proportional lens diameter. When employed with a large-panel LCD, the resulting long barrel length and lens diameter would require a significantly larger pedestal structure than the short pedestals provided by the present invention.

As illustrated by these examples, the projection lenses of the invention are well-suited to the manufacture of compact, light weight, projection televisions and monitors which employ pixelized panels.

Other Examples of suitable lenses can be found in U.S. patent application Ser. No. 10/858786, entitled "Compact Projection Lenses for use with Large Fomat Pixilized Panels", filed on even date herewith, and U.S. patent application ser. No. 10/858777, entitled "Color-Corrected Projection Lenses for use with Pixilized Panels", filed on even date herewith, both of which are incorporated herein by reference.

TABLE 1A

Lens Prescription

| Surf | Radius | Thickness | Glass | Diameter | Type |
|---|---|---|---|---|---|
| Object | Infinity | 755.645 | | 1584 | |
| R1 | 61.1886 | 6.500 | ACRYLIC | 120 | Plastic Asph. |
| R2 | 34.7014 | 40.700 | | 94 | Plastic Asph. |
| R3 | 81.7806 | 7.500 | S-LAH60 | 72 | |
| R4 | 141.0022 | 20.000 | | 72 | |
| Stop | Infinity | 15.850 | | 38 | |
| R5 | 200 | 21.000 | S-LAL18 | 68 | |
| R6 | −61.9734 | 4.000 | SF2 | 68 | |
| R7 | 1439.0090 | 7.666 | | 74 | |
| R8 | −98.7976 | 4.500 | S-TIL6 | 76 | |
| R9 | −364.3930 | 1.000 | | 86 | |
| R10 | −166.9567 | 12.000 | ACRYLIC | 86 | Plastic Asph. |
| R11 | −67.8402 | 226.119 | | 92 | Plastic Asph. |
| Fresnel | Infinity | 2.400 | PMMA | 420 | |
| Fresnel | −139.8134 | 17.000 | | 420 | Fresnel Asph. |
| Coverglass | Infinity | 1.700 | BK7 | 420 | |
| | Infinity | 2.400 | | 420 | |
| LCD/image | Infinity | | | 420 | |

Even Polynomial Aspheres

| Surf | k | D | E | F |
|---|---|---|---|---|
| 1 | −9.652975 | 1.65914E−07 | 6.99128E−12 | −8.40763E−16 |
| 2 | −3.510827 | 2.99206E−06 | −1.05738E−09 | 3.98975E−13 |
| 10 | 1.234806 | 2.87799E−07 | 7.15829E−10 | 4.89699E−14 |
| 11 | −1.276786 | 3.11936E−07 | 2.50748E−10 | 4.88367E−13 |
| Fresnel | −1.956548 | −4.78575E−08 | 2.22198E−12 | −1.33168E−16 |

| Surf | G | H | I |
|---|---|---|---|
| 1 | −5.93220E−19 | 0.00000E+00 | |
| 2 | −4.78825E−17 | −4.31913E−21 | |
| 10 | −1.62473E−17 | −1.38044E−20 | |
| 11 | −7.89197E−17 | −2.02647E−20 | |
| Fresnel | 4.26516E−21 | −6.29319E−26 | 3.30111E−31 |

First Order Properties of Elements:

| Element # | Surface #'s | EFL |
|---|---|---|
| 1 | R1-R2 | −177.0 |
| 2 | R3-R4 | 219.5 |
| *3 | R5-R6 | 66.9 |
| *4 | R6-R7 | −91.11 |

TABLE 1A-continued

| | | |
|---|---|---|
| 5 | R8-R9 | −254.7 |
| 6 | R10-R11 | 223.0 |

Doublet Properties

| Element #'s | Surface #'s | EFL |
|---|---|---|
| 3-4 | R5-R7 | 224.1 |

Group EFL Properties

| Element #'s | Surface #'s | EFL |
|---|---|---|
| Total w/o fresnel | R1-R11 | 182.5 |
| 1-2 | R1-R4 | −2916.0 |
| 3-6 | R5-R11 | 204.0 |

First Order Data:

| | |
|---|---|
| F/Number | 7.0 |
| Magnification | 4.06 |
| Object Height | 792.0 |
| Object Distance | |
| Image Height | 195.00 |
| Effective Focal Length (EFL) | 201.20 |
| EFL without Fresnel | 182.50 |
| Barrel Length (BRL) | 140.7 |
| Front Vertex Distance (FVD) | 390.2 |
| Entrance Pupil Distance | 83.0 |
| Exit Pupil Distance | 11000.0 |
| Stop Diameter | 28.7 |
| Field Angle (semi-diag; degrees; long conjugate) | 44.30 |
| Field Angle (semi-diag; degrees; short conjugate) | 34.7 |

*note: separate elements of doublet are given as if each were in air

TABLE 1B

Lens Prescription

| Surf | Radius | Thickness | Glass | Diameter | Type |
|---|---|---|---|---|---|
| Object | Infinity | 741.35 | | 1584 | |
| R1 | 68.259 | 7.00 | ACRYLIC | 120 | Plastic Asph. |
| R2 | 36.938 | 32.61 | | 94 | Plastic Asph. |
| R3 | 193.131 | 6.00 | S-TIH14 | 72 | |
| R4 | 594.370 | 23.87 | | 72 | |
| Stop | Infinity | 9.63 | | 38 | |
| R5 | 250.000 | 24.00 | S-LAL18 | 68 | |
| R6 | −46.513 | 3.50 | S-FTM16 | 68 | |
| R7 | −464.000 | 19.06 | | 74 | |
| R8 | −324.473 | 3.50 | S-TIL6 | 76 | |
| R9 | 324.473 | 4.74 | | 86 | |
| R10 | −149.557 | 7.26 | ACRYLIC | 86 | Plastic Asph. |
| R11 | −78.406 | 212.22 | | 92 | Plastic Asph. |
| Fresnel | Infinity | 2.40 | PMMA | 420 | |
| Fresnel | −139.955 | 12.00 | | 420 | Fresnel Asph. |
| Coverglass | Infinity | 1.70 | BK7 | 420 | |
| | Infinity | 2.40 | | 420 | |
| LCD/image | Infinity | | | 420 | |

Even Polynomial Aspheres

| Surf | k | D | E | F |
|---|---|---|---|---|
| 1 | −4.590606 | −7.64064E−08 | −1.92073E−12 | 7.04605E−15 |
| 2 | −2.470352 | 3.07379E−06 | −1.05632E−09 | 4.48346E−13 |
| 10 | −4.135202 | 4.59146E−07 | 5.19531E−10 | 4.47263E−14 |
| 11 | −2.442999 | 4.71005E−07 | 2.63157E−10 | 4.74425E−13 |
| Fresnel | −0.5219711 | −1.78610E−09 | 1.95804E−12 | −9.02750E−17 |

| Surf | G | H | I |
|---|---|---|---|
| 1 | −2.42321E−18 | | |
| 2 | −2.99183E−17 | −2.22559E−20 | |
| 10 | 3.42868E−17 | −4.14616E−20 | |
| 11 | −1.15771E−16 | −2.26009E−20 | |
| Fresnel | 3.88480E−21 | −1.03493E−25 | 1.34282E−30 |

First Order Properties of Elements:

| Element # | Surface #'s | EFL |
|---|---|---|
| 1 | R1-R2 | −176.0 |
| 2 | R3-R4 | 369.8 |
| *3 | R5-R6 | 55.52 |
| *4 | R6-R7 | −86.91 |
| 5 | R8-R9 | −302.50 |
| 6 | R10-R11 | 322.84 |

Doublet Properties

| Element #'s | Surface #'s | EFL |
|---|---|---|
| 3-4 | R5-R7 | 235.13 |

Group EFL Properties

| Element #'s | Surface #'s | EFL |
|---|---|---|
| Total w/o fresnel | R1-R11 | 172.16 |
| 1-2 | R1-R4 | −385.67 |
| 3-6 | R5-R11 | 152.77 |

First Order Data:

| | |
|---|---|
| F/Number | 7.0 |
| Magnification | 4.06 |
| Object Height | 792.0 |
| Object Distance | 741.35 |
| Image Height | 195.00 |
| Effective Focal Length (EFL) | 190.62 |
| EFL without Fresnel | 172.16 |
| Barrel Length (BRL) | 141.17 |
| Front Vertex Distance (FVD) | 372.01 |
| Entrance Pupil Distance | 65.05 |
| Exit Pupil Distance | −22307 |
| Stop Diameter | 27.23 |
| Field Angle (semi-diag; degrees; long conjugate) | 44.89 |
| Field Angle (semi-diag; degrees; short conjugate) | 35.72 |

*note: separate elements of doublet are given as if each were in air

TABLE 2

Lens Prescription

| Surf | Radius | Thickness | Glass | Diameter | Type |
|---|---|---|---|---|---|
| Object | Infinity | 774.450 | | 1,584 | |
| R1 | 63.20524 | 5.100 | ACRYLIC | 100 | Plastic asphere |
| R2 | 37.20784 | 32.632 | | 84 | Plastic asphere |
| R3 | 95.93437 | 5.500 | S-LAH60 | 62 | |
| R4 | 251.52000 | 19.681 | | 56 | |
| Stop | Infinity | 10.429 | | 40 | |
| R5 | 979.75220 | 23.500 | S-LAL18 | 52 | |
| R6 | −44.88326 | 5.700 | SF2 | 52 | |
| R7 | −235.64470 | 10.857 | | 64 | |
| R8 | −64.30484 | 13.500 | S-TIL6 | 68 | |
| R9 | −167.20560 | 4.000 | | 86 | |
| R10 | −94.85293 | 13.000 | ACRYLIC | 88 | Plastic asphere |
| R11 | −56.84605 | 213.000 | | 94 | Plastic asphere |
| Fresnel | Infinity | 2.400 | PMMA | 392 | |
| Fresnel | −152.00770 | 16.000 | | 394 | Fresnel Asph |
| Coverglass | Infinity | 1.700 | BK7 | 391 | |
| LCD/image | Infinity | 2.400 | | 391 | |

TABLE 2-continued

Even Polynomial Aspheres

| Surf | k | D | E | F |
|---|---|---|---|---|
| 1 | −18.36055 | 0 | | |
| 2 | −5.93669 | 3.02566E−06 | −1.56956E−09 | 5.84265E−13 |
| 10 | 1.62343 | −2.02186E−07 | 1.05660E−09 | −8.30212E−14 |
| 11 | −0.69378 | −9.81953E−08 | 9.50250E−11 | 4.10160E−13 |
| Fresnel | −0.46094 | −1.05868E−08 | 1.80232E−12 | −1.55126E−17 |

| Surf | G | H |
|---|---|---|
| 1 | | |
| 2 | −9.93927E−17 | 3.99940E−21 |
| 10 | 9.48857E−18 | −4.85877E−21 |
| 11 | −4.94773E−17 | −1.01177E−20 |
| Fresnel | −1.21963E−21 | 3.17137E−26 |

First Order Properties of Elements:

| Element # | Surface #'s | EFL |
|---|---|---|
| 1 | R1-R2 | −197.1 |
| 2 | R3-R4 | 183.2 |
| *3 | R5-R6 | 59.5 |
| *4 | R6-R7 | −86.7 |
| 5 | R8-R9 | −205.5 |
| 6 | R9-R10 | 259.9 |

Doublet Properties

| Element #'s | Surface #'s | EFL |
|---|---|---|
| 3-4 | R5-R7 | 191.2 |

Group EFL Properties

| Element #'s | Surface #'s | EFL |
|---|---|---|
| Total w/o fresnel | R1-R11 | 184.3 |
| 1-2 | R1-R4 | 914.3 |
| 3-6 | R5-R11 | 239.7 |

First Order Data:

| | |
|---|---|
| F/Number | 7.0 |
| Magnification | 4.06 |
| Object Height | 792.0 |
| Object Distance | 774.5 |
| Image Height | 195.00 |
| Effective Focal Length (EFL) | 202.60 |
| EFL without Fresnel | 184.30 |
| Barrel Length (BRL) | 143.9 |
| Front Vertex Distance (FVD) | 380.1 |
| Entrance Pupil Distance | 95.6 |
| Exit Pupil Distance | −8500.0 |
| Stop Diameter | 28.9 |
| Field Angle (semi-diag; degrees; long conjugate) | 43.90 |
| Field Angle (semi-diag; degrees; short conjugate) | 34.6 |

*note: separate elements of doublet are given as if each were in air

TABLE 3

Lens Prescription

| Surf | Radius | Thickness | Glass | Diameter | Type |
|---|---|---|---|---|---|
| Object | Infinity | 646.850 | | 1,320.0 | |
| R1 | 101.015 | 5.000 | ACRYLIC | 83.5 | Plastic asphere |
| R2 | 38.212 | 16.292 | | 66.2 | Plastic asphere |
| R3 | 62.137 | 6.728 | S-LAH60 | 57.5 | |
| R4 | 100.042 | 19.767 | | 53.8 | |
| Stop | Infinity | 10.756 | | 32.2 | |
| R5 | 151.173 | 19.000 | S-LAL18 | 50.6 | |
| R6 | −45.686 | 3.100 | SF2 | 52.0 | |
| R7 | −218.093 | 7.042 | | 61.5 | |
| R8 | −117.756 | 9.000 | S-TIL6 | 65.3 | |
| R9 | 252.375 | 3.300 | | 76.7 | |
| R10 | −150.159 | 8.859 | ACRYLIC | 78.2 | Plastic asphere |
| R11 | −64.728 | 180.319 | | 80.4 | Plastic asphere |
| Fresnel | Infinity | 2.000 | PMMA | 337.1 | |
| Fresnel | Infinity | 14.000 | | 338.7 | Fresnel |
| Coverglass | Infinity | 1.500 | BK7 | 337.7 | |
| LCD/image | Infinity | 2.000 | | 337.8 | |

Even Polynomial Aspheres

| Surf | k | D | E | F |
|---|---|---|---|---|
| 1 | −8.85430 | | | |
| 2 | −3.32606 | 5.51778E−06 | −2.56717E−09 | 1.25125E−12 |
| 10 | −21.02927 | 3.57810E−07 | 9.19490E−10 | 5.30768E−13 |
| 11 | −1.84682 | 8.85209E−07 | 3.49187E−10 | 1.04980E−12 |
| Fresnel | −4.28842E−03 | −5.35737E−09 | −1.24206E−12 | 1.07348E−16 |

| Surf | G | H |
|---|---|---|
| 1 | | |
| 2 | −1.53214E−16 | |
| 10 | −6.60324E−17 | −1.31481E−19 |
| 11 | 9.44401E−17 | −2.43104E−19 |
| Fresnel | −3.85673E−21 | 4.96338E−26 |

First Order Properties of Elements:

| Element # | Surface #'s | EFL |
|---|---|---|
| 1 | R1-R2 | −125.2 |
| 2 | R3-R4 | 141.6 |
| *3 | R5-R6 | 50.0 |
| *4 | R6-R7 | −89.3 |
| 5 | R8-R9 | −132.8 |
| 6 | R10-R11 | 179.4 |

Doublet Properties

| Element # | Surface #'s | EFL |
|---|---|---|
| 3-4 | R5-R7 | 127.5 |

Group EFL Properties

| Element # | Surface #'s | EFL |
|---|---|---|
| Total w/o fresnel | R1-R11 | 156.4 |
| 1-2 | R1-R4 | −3829.0 |
| 3-6 | R5-R11 | 166.7 |

First Order Data:

| | |
|---|---|
| F/Number | 6.0 |
| Magnification | 3.93 |
| Object Height | 660.0 |
| Object Distance | 646.8 |
| Image Height | 168.00 |
| Effective Focal Length (EFL) | 174.47 |
| EFL without Fresnel | 156.40 |
| Barrel Length (BRL) | 110.4 |
| Front Vertex Distance (FVD) | 306.5 |
| Entrance Pupil Distance | 84.2 |
| Exit Pupil Distance | 56000.0 |
| Stop Diameter | 21.8 |
| Field Angle (semi-diag; degrees; long conjugate) | 44.00 |
| Field Angle (semi-diag; degrees; short conjugate) | 36.6 |

*note: separate elements of doublet are given as if each were in air

TABLE 4

Lens Prescription

| Surf | Radius | Thickness | Glass | Diameter | Type |
|---|---|---|---|---|---|
| OBJ | Infinity | 688.803 | | 1,300.0 | |
| R1 | 249.119 | 6.000 | ACRYLIC | 70.0 | Plastic asphere |
| R2 | 42.073 | 15.001 | | 54.0 | Plastic asphere |
| R3 | 61.917 | 3.646 | S-LAH60 | 46.1 | |
| R4 | 141.092 | 12.183 | | 45.1 | |
| STO | Infinity | 11.218 | | 26.0 | |
| R5 | 72.675 | 16.000 | S-PHM53 | 52.0 | |
| R6 | −41.905 | 2.500 | BPH5 | 52.0 | |
| R7 | 254.366 | 6.688 | | 52.0 | |
| R8 | −48.272 | 13.225 | ACRYLIC | 58.2 | Plastic asphere |
| R9 | −39.553 | 153.485 | | 65.6 | Plastic asphere |
| Fresnel | Infinity | 2.000 | PMMA | 262.4 | |
| — | Infinity | 10.000 | | 263.9 | |
| Cvrglss/polzr | Infinity | 3.000 | BK7 | 262.5 | |
| — | Infinity | 0.768 | | 262.2 | |
| LCD/image | | | | 260.1 | |

Even Polynomial Aspheres

| Surf | k | D | E | F |
|---|---|---|---|---|
| 1 | 0.000000 | 4.88590E−07 | −1.29138E−09 | 9.50012E−13 |
| 2 | −4.852427 | 8.58791E−06 | −8.95905E−09 | 7.58528E−12 |
| 8 | −12.100460 | −1.11633E−05 | 2.09397E−08 | −8.82767E−12 |
| 9 | −0.632851 | 1.89526E−06 | −1.21100E−09 | 1.07489E−11 |
| Fresnel | −4.95310E−03 | 1.72947E−08 | −5.87066E−12 | 5.21696E−16 |

| Surf | G | H |
|---|---|---|
| 1 | −2.91143E−16 | |
| 2 | −3.47633E−15 | |
| 8 | −5.79639E−16 | |
| 9 | −5.52470E−15 | |
| Fresnel | −2.27597E−20 | 3.86315E−25 |

First Order Properties of Elements:

| Element # | Surface #'s | EFL |
|---|---|---|
| 1 | R1-R2 | −103.7 |
| 2 | R3-R4 | 128.9 |
| *3 | R5-R6 | 42.7 |
| *4 | R6-R7 | −42.8 |
| *5a -- R8 one side only | R8 | −98.0 |
| *5b -- R9 one side only | R9 | 80.3 |
| *5 | R8-R9 | 296.1 |

Doublet Properties

| Element # | Surface #'s | EFL |
|---|---|---|
| 3-4 | R5-R7 | 206.4 |

Group EFL Properties

| Element # | Surface #'s | EFL |
|---|---|---|
| Total w/o fresnel | R1-R9 | 133.0 |
| 1-2 | R1-R4 | −1070.0 |
| 3-5 | R5-R9 | 137.7 |

First Order Data:

| | |
|---|---|
| F/Number | 6.0 |
| Magnification | 5.00 |
| Object Height | 650.0 |
| Object Distance | 688.8 |
| Image Height | 130.00 |
| Effective Focal Length (EFL) | 143.80 |
| EFL without Fresnel | 132.90 |
| Barrel Length (BRL) | 86.4 |
| Front Vertex Distance (FVD) | 258.7 |

TABLE 4-continued

| | |
|---|---|
| Entrance Pupil Distance | 108.4 |
| Exit Pupil Distance | 9600.0 |
| Stop Diameter | 24.0 |
| Field Angle (semi-diag; degrees; long conjugate) | 42.25 |
| Field Angle (semi-diag; degrees; short conjugate) | 30.9 |

*note: separate elements of doublet are given as if each were in air and thick element 5 has each surface, focal length listed individually.

TABLE 5*

| | Example 1A | Example 1B | Example 2 | Example 3 | Example 4 |
|---|---|---|---|---|---|
| $f_{U2}/f_0$ | 1.12 | 0.89 | 1.30 | 1.07 | 1.04 |
| $f_{U2S1}/f_0$ | 1.23 | 1.37 | 1.04 | 0.82 | 1.55 |
| $|f_{neg}|/f_0$ | 1.40 | 1.76 | 1.12 | 0.85 | — |
| $1/(|\phi_{neg}| \cdot f_0)$ | — | — | — | — | 0.74 |
| $FOV_{LC}$ | 88.6° | 89.8° | 87.8° | 88.0° | 84.5° |
| $FOV_{SC}$ | 69.4° | 71.4° | 69.2° | 73.2° | 61.8° |

*$f_0$ is without Fresnel

TABLE 6*

| | Example 1A | Example 1B | Example 2 | Example 3 | Example 4 |
|---|---|---|---|---|---|
| $BRL/f_0$ | 0.77 | 0.82 | 0.78 | 0.71 | 0.65 |
| $CA_{max}/f_0$ | 0.66 | 0.70 | 0.54 | 0.53 | 0.53 |
| $BRL/D_{PP}$ | 0.37 | 0.37 | 0.38 | 0.33 | 0.35 |
| $CA_{max}/D_{PP}$ | 0.32 | 0.32 | 0.26 | 0.25 | 0.28 |

*$f_0$ is without Fresnel

What is claimed is:

1. A table-top rear projection television, comprising:
a cabinet having a pedestal positioned below and supporting a display screen having a display screen height H, the pedestal having a height and a depth that each are less than or equal to 0.65H;
an illumination system positioned in the pedestal and directing light along an optical path;
a large-panel pixelated, transmissive multicolor display panel receiving the light from the illumination system and imparting video images on the light;
a first fold mirror and a short vertex-to-vertex projection lens that receive the light with the imparted video images;
a long conjugate fold mirror that folds the optical path from the projection lens and directs the light through the display screen;
whereby the projection lens has plural lens elements each with a diameter less than a maximum lens diameter and the large-panel pixelated, transmissive multicolor display has a diagonal dimension; and
whereby a ratio between the maximum lens diameter and the diagonal dimension is less than or equal to 0.3.

2. The television of claim 1 in which the first fold mirror is a short conjugate fold mirror.

3. The television of claim 1 in which the large-panel pixelated, transmissive multicolor display includes a liquid crystal display.

4. The television of claim 3 in which the liquid crystal display has a diagonal dimension of at least 17.5 cm.

5. The television of claim 1 in which the large-panel pixelated, transmissive multicolor display has a diagonal dimension of at least 17 cm.

6. The television of claim 1 in which the projection lens has an output half-angle of 44°-46° to diagonal corners.

7. The television of claim 1 in which the long conjugate fold mirror folds the optical path by a half-angle of 33°-35.

8. The television of claim 1 in which the projection lens has a vertex-to-vertex dimension of 70 mm-150 mm.

9. The television of claim 1 in which the projection lens has a retrofocus characteristic.

10. The television of claim 1 in which the projection lens has a vertex-to-vertex dimension and the large-panel pixelated, transmissive multicolor display has a diagonal dimension, and in which a ratio between the vertex-to-vertex dimension and the diagonal dimension is less than or equal to 0.4.

11. A table-top rear projection television optical system, comprising:
   an illumination system positioned in the pedestal arid directing light along an optical path;
   only one large-panel pixelated, transmissive multicolor display panel receiving the light from the illumination system and imparting video images on the light;
   a first fold mirror and a short vertex-to-vertex projection lens that receive the light with the imparted video images;
   a long conjugate fold mirror that folds the optical path from the projection lens and directs the light through the display screen,
   whereby the illumination system, the large multicolor display panel, the short conjugate fold mirror, and the short vertex-to-vertex projection lens are positioned and sized to fit within a pedestal positioned below and supporting a display screen having a display screen height H, the pedestal having a height and a depth that each are less than or equal to 0.65H; and
   whereby the projection lens has an output half-angle of 44°-46° to diagonal corners.

12. The television of claim 11 in which the first fold mirror is a short conjugate fold mirror.

13. The system of claim 11 in which the large-panel pixelated, transmissive multicolor display includes a liquid crystal display.

14. The system of claim 13 in which the liquid crystal display has a diagonal dimension of at least 17 cm.

15. The system of claim 11 in which the large-panel pixelated, transmissive multicolor display has a diagonal dimension of at least 17 cm.

16. The system of claim 11 in which the long conjugate fold mirror folds the optical path by a half-angle of 33°-35°.

17. The system of claim 11 in which the projection lens has a vertex-to-vertex dimension of 70 mm-150 mm.

18. The system of claim 11 in which the projection lens has a retrofocus characteristic.

19. The system of claim 11 in which the projection lens has a vertex-to-vertex dimension and the large-panel pixelated, transmissive multicolor display has a diagonal dimension, and in which a ratio between the vertex-to-vertex dimension and the diagonal dimension is less than or equal to 0.4.

20. The system of claim 11 in which the projection lens has plural lens elements each with a diameter less than a maximum lens diameter and the large-panel pixelated, transmissive multicolor display has a diagonal dimension, and in which a ratio between the maximum lens diameter and the diagonal dimension is less than or equal to 0.3.

21. A table-top rear projection television, comprising:
   a cabinet having a pedestal positioned below and supporting a display screen having a display screen height H, the pedestal having a height that each is less than or equal to 0.55H;
   an illumination system positioned in the pedestal and directing light along an optical path;
   a large-panel pixelated, transmissive multicolor display panel receiving the light from the illumination system and imparting video images on the light;
   a first fold mirror and a short vertex-to-vertex projection lens that receive the light with the imparted video images;
   a long conjugate fold mirror that folds the optical path from the projection lens and directs the light through the display screen; and
   whereby the projection lens has a retrofocus characteristic.

22. The television of claim 21 in which the first fold mirror is a short conjugate fold mirror.

23. The television of claim 21 in which the large-panel pixelated, transmissive multicolor display includes a liquid crystal display.

24. The television of claim 23 in which the liquid crystal display has a diagonal dimension of at least 17 cm.

25. The television of claim 21 in which the large-panel pixelated, transmissive multicolor display has a diagonal dimension of at least 17 cm.

26. The television of claim 21 in which the protection lens has an output half-angle of 44-46° to diagonal corners.

27. The television of claim 21 in which the long conjugate fold mirror folds the optical path by a half-angle of 33°-35°.

28. The television of claim 21 in which to projection lens has a vertex-to-vertex dimension of 70 mm-150 mm.

* * * * *

UNITED STATES PATENT AND TRADEMARK OFFICE
CERTIFICATE OF CORRECTION

PATENT NO. : 7,259,801 B2
APPLICATION NO. : 10/858785
DATED : August 21, 2007
INVENTOR(S) : Arlie R. Conner It is certified that error appears in the above-identified patent and that said Letters Patent is hereby corrected as shown below:

Column 8
Line 17, delete "Fomat" and insert -- Format --, therefor.

Column 14
Line 9, delete "surface," and insert -- surface --, therefor.

Column 15
Line 4, in Claim 7, delete "33°-35." and insert -- 33°-35°. --, therefor.
Line 17, in Claim 11, delete "arid" and insert -- and --, therefor.

Column 16
Line 43, in Claim 26, delete "protection" and insert -- projection --, therefor.
Line 44, in Claim 26, delete "44-46°"" and insert -- 44°-46° --, therefor.
Line 47, in Claim 28, delete "to" and insert -- the --, therefor.

Signed and Sealed this

Twenty-fifth Day of December, 2007

JON W. DUDAS
*Director of the United States Patent and Trademark Office*